United States Patent
Ziv et al.

(10) Patent No.: US 6,292,662 B1
(45) Date of Patent: Sep. 18, 2001

(54) METHOD AND SYSTEM FOR PROCESSING TELEPHONE CALLS INVOLVING TWO DIGITAL WIRELESS SUBSCRIBER UNITS THAT AVOID DOUBLE VOCODING

(75) Inventors: Noam A. Ziv; Barry Robbins, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 08/535,998

(22) Filed: Sep. 29, 1995

(51) Int. Cl.[7] .................................................. H04Q 7/38
(52) U.S. Cl. ................................. 455/445; 455/436
(58) Field of Search ...................... 455/445, 428, 455/560, 561, 403, 422, 432, 436, 438, 424, 466, 416, 426, 448, 553, 552; 379/202–205, 93.21

(56) References Cited

U.S. PATENT DOCUMENTS

| | | | |
|---|---|---|---|
| 4,187,398 | * 2/1980 | Stark | 455/456 |
| 4,782,326 | 11/1988 | Bush | 341/76 |
| 4,802,206 | * 1/1989 | Yoshida et al. | 379/204 |
| 5,173,933 | * 12/1992 | Jabs et al. | 455/445 |
| 5,278,892 | * 1/1994 | Bolliger et al. | 455/442 |
| 5,317,567 | 5/1994 | Champion | 370/62 |
| 5,504,804 | * 4/1996 | Widmark et al. | 455/445 |
| 5,509,004 | * 4/1996 | Bishop, Jr. et al. | 370/325 |
| 5,526,400 | * 6/1996 | Nguyen | 455/445 |
| 5,577,029 | * 11/1996 | Lu et al. | 455/445 |
| 5,608,779 | * 3/1997 | Lev et al. | 455/403 |

FOREIGN PATENT DOCUMENTS

| | | | |
|---|---|---|---|
| 0605311 | 7/1994 | (EP) | H04B/7/26 |
| 0664658 | 7/1995 | (EP) | H04Q/11/04 |
| 9300778 | 1/1993 | (WO) . | |
| 9515665 | 6/1995 | (WO) | H04Q/7/24 |
| 9524789 | 9/1995 | (WO) . | |
| 9642176 | 12/1996 | (WO) | H04Q/7/24 |

OTHER PUBLICATIONS

"Intelligibility Testing of the Continuous Variable Slope Delta (CVSD) Coder–Decoder (CODEC)", by Elis D. Hanson; *Research and Development Technical Report ECOM–3393*, Feb. 1971.

* cited by examiner

Primary Examiner—Dwayne D. Bost
Assistant Examiner—Tracy M. Legree
(74) Attorney, Agent, or Firm—Philip R. Wadsworth; Thomas R. Rouse

(57) ABSTRACT

A method and system for processing telephone calls within a digital wireless telephone system is described. During the initiation of a telephone call from a wireless subscriber unit, it is determined whether the receiving subscriber unit is also part of a digital wireless telephone system that has compatible vocoding capability. If so, vocoded data from the digital wireless telephone system is converted into tones that are introduced into a wire based telephone system for routing to the appropriate receiving digital wireless telephone system. When these tones are received by the receiving digital wireless telephone system, the vocoded data is regenerated based on the tones and then transmitted to the receiving subscriber unit. If the originating and receiving wireless subscriber units are part of the same digital wireless telephone system, the steps of conversion to tones and introduction into the wire based telephone system are omitted, and the call is routed completely within that digital wireless telephone system. In another embodiment of the invention, the step of conversion to tones is entirely omitted and the vocoded data is passed between the two digital wireless telephone systems via an all digital connection such as an ATM packet network or a wire based telephone connection where the integrity of digital information is assured.

5 Claims, 2 Drawing Sheets

METHOD AND SYSTEM FOR PROCESSING TELEPHONE CALLS INVOLVING TWO DIGITAL WIRELESS SUBSCRIBER UNITS THAT AVOID DOUBLE VOCODING

BACKGROUND OF THE INVENTION

I. Field of the Invention

The present invention relates to digital communications. More particularly, the present invention relates to a novel and improved method and system for interfacing a digital telephone system with a standard public switched telephone network to avoid double vocoding.

II. Description of the Related Art

Digital wireless telephone systems provide telephone service via the use radio of frequency (RF) signals and digital signal processing techniques. The use of RF signals provides the advantage of mobility over traditional wire based telephone systems, and reduces the amount of infrastructure necessary to implement the telephone system. The use of digital signal processing techniques allows telephone calls to be transmitted more efficiently and thereby allows digital wireless telephone systems to carry greater numbers of telephone calls over a given amount of RF bandwidth when compared to a non-digital wireless telephone systems. Maximizing the efficiency with which a wireless telephone system utilizes RF bandwidth is desirable because the amount of RF bandwidth available is a limiting factor as to the number of telephone calls the particular wireless telephone system can carry.

One of the most common types of digital signal processing techniques utilized within a digital wireless telephone systems is vocoding. Vocoding incorporates the use of selective data elimination and data compression to convert a first digital representation of audio information, usually generated by sampling, into a second digital representation that requires less data. Selective data elimination is the act of eliminating some of the information encoded by the data in a way that still allows a comprehensible version of the original audio information to be generated. By eliminating data, and compressing the data which remains, vocoding substantially reduces the amount of digital data that must be transmitted across the RF interface of the wireless telephone system for a telephone call and thereby increases the total number of calls that the wireless telephone systems can carry.

In general, the data associated with a telephone call involving a digital wireless telephone system is introduced into a wire based telephone system for routing to the receiving subscriber unit which is usually part of a wire based telephone system. Wire based telephone systems have traditionally performed the routing function and generally store the information necessary to complete each telephone call. Before being introduced into the wire based telephone system, however, the vocoded data from the digital wireless telephone system must be devocoded using signal processing resources within the digital wireless telephone system. This is because wire based telephone systems generally lack the resources necessary for devocoding the data so that it can be understood by the end user. Once introduced into the wire based telephone system the devocoded data is routed to the receiving subscriber unit.

If the receiving subscriber unit is also part of a digital wireless telephone system, referred to herein as a "wireless subscriber unit," the devocoded data is routed into the associated digital wireless telephone system. Upon being introduced into the digital wireless telephone system the devocoded data is revocoded so that it may be processed further by the digital wireless telephone system. Because selective data elimination causes some audio information to be lost, however, vocoding audio information that has previously been vocoded and devocoded substantially degrades the quality of the audio information that is ultimately produced. Therefore, this present system of routing telephone calls between two wireless subscriber units causes undesirable degradation of audio information. While this "double vocoding" is presently a limited problem because the majority of telephone calls involve at least one wire based subscriber unit, the number of digital wireless subscribers to digital wireless subscriber telephone calls is steadily increasing as the availability of wireless telephone service also increases. Therefore, there is a need for an improved method and system for processing telephone calls where both the initiating and receiving subscribers are part of a wireless telephone system.

Various other changes in telecommunications technology, in addition to the increasing availability of wireless telephone service, have also altered the way people use their telephones. Two of the most prevalent examples of such changes are conference calling and call waiting. Conference calling allows multiple subscribers to communicate with each other simultaneously, and requires that outgoing audio information from two or more subscriber units be combined before being supplied to a receiving subscriber unit. This combining adds additional complexity to the processing of calls involving two or more wireless subscriber units because vocoded data cannot readily be combined in this manner. The call waiting feature allows a single subscriber to alternately communicate with two other subscribers. This can give rise to the situation where a wireless subscriber must interface with both another wireless subscriber and a wire based subscriber further complicating the processing of a wireless subscriber to a wireless subscriber call. These features are very popular services with telephone service subscribers, however, and are a substantial source of revenue for telephone service providers. Therefore, it is desirable to have any improved system and method for processing telephone calls involving two or more wireless subscriber units that also accommodate the use of conference calling and call waiting.

SUMMARY OF THE INVENTION

Based on the forgoing, a method and system for processing telephone calls within a digital wireless telephone system is described. During the initiation of a telephone call from a wireless subscriber unit, it is determined whether the receiving subscriber unit is also part of a digital wireless telephone system that has compatible vocoding capability. If so, vocoded data from the digital wireless telephone system is converted into tones that are introduced into a wire based telephone system for routing to the appropriate receiving digital wireless telephone system. When these tones are received by the receiving digital wireless telephone system, the vocoded data is regenerated based on the tones and then transmitted to the receiving subscriber unit. If the originating and receiving wireless subscriber units are part of the same digital wireless telephone system, the steps of conversion to tones and introduction into the wire based telephone system are omitted, and the call is routed completely within that digital wireless telephone system. In another embodiment of the invention, the step of conversion to tones is entirely omitted, and the vocoded data is passed between the two digital wireless telephone systems via an all digital connection such as an ATM packet network or a wire based telephone connection where the integrity of digital information is assured.

When a conference call is initiated by one of the wireless subscriber units involved in the telephone call, data from both wireless subscriber units is devocoded and placed into analog format so that it can be summed. Additionally, signal processing resources are allocated for the call if the two original wireless subscriber units were part of the same part of the same digital wireless telephone system. When the call waiting feature is activated by a wireless subscriber unit, involved in a phone call with another wireless subscriber unit additional signal processing resources are also allocated for both the incoming and outgoing data associated with the second call so that it may be properly processed.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In the following description of a method and system for processing telephone calls within a digital wireless telephone system, various references are made to processes and steps that are performed via the use of "commands", "instructions", and "requests". It should be understood that such references do not describe human actions or thoughts, but are directed towards the operation, modification and transformation of various systems including especially those systems which process electrical, electromagnetic, and magnetic signals and charges, optical signals, or a combination thereof. Fundamental to such systems is the use of various information storage devices, often referred to as "memory", which store information via the placement and organization of atomic, sub-atomic and super-atomic particles on hard disk media, tape, or within silicon, gallium arcinide, or other semiconductor based integrated circuits, and the use of various information processing devices, often referred to as "microprocessors", which alter their condition and state in response to such electrical and electromagnetic signals and charges. Memory and microprocessors that store and process light energy or particles having special optical characteristics, or a combination thereof, are also contemplated and their use is consistent with the operation of the described invention.

Additionally, various protocols and system configurations are described in detail throughout the application including the use of a code division multiple access (CDMA) cellular telephone system. This is done for purposes of illustration and example, and should not be construed as limiting the scope of the invention. Those skilled in the art will understand that the invention can be used within the context of other digital systems and networks as well. Also, various other well known systems and configurations are described throughout the application in block form. This is done in order to avoid unnecessarily obscuring the disclosure of the present invention.

Figure 1:
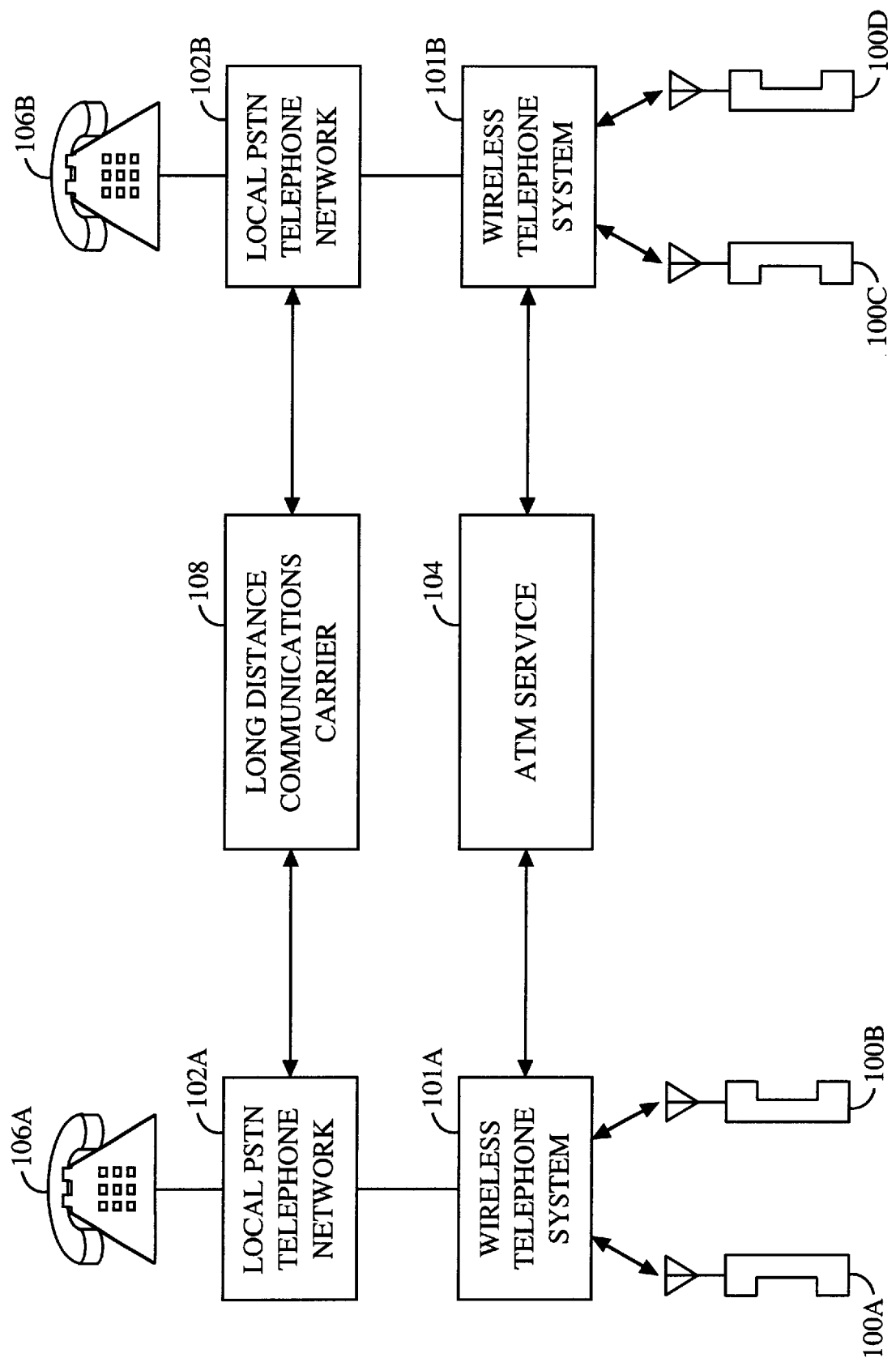
FIG. 1 is a block diagram of a telecommunications network configured in accordance with one embodiment of the invention.

FIG. 1 is a block diagram of a telephone network configured in accordance with one embodiment of the invention. Asynchronous transfer mode (ATM) service 104 is coupled between wireless telephone system 101(A) and wireless telephone system 101(B), and long distance telecommunications carrier 108 is coupled between local public switch telephone network (PSTN) 102(A) and local PSTN 102(B). Wireless subscriber units 100(A) and 100(B) are coupled to digital wireless telephone system 101(A) via first and second radio frequency signal links (RF links) respectively, and wireless subscriber units 100(C) and 100 (D) are coupled to digital wireless telephone system 101(B) via third and fourth RF links respectively. In the preferred embodiment these RF links operate in accordance with code division multiple access (CDMA) spread spectrum protocols for improved efficiency and reliability. Local PSTN 102(A) is coupled to wireless telephone system 101(A) and wire based subscriber unit 106(A), and local PSTN 102(B) is coupled to wireless telephone system 101(B) and wire based subscriber unit 106(B). In alternative embodiments of the invention ATM service 104 may also be coupled to either of local PSTN's 102(A) or 102(B), or both, and long distance telecommunications carrier 108 may be coupled to either digital wireless telephone systems 101(A) or 101(B), or both.

In an exemplary call initiated by wireless subscriber unit 100(A), call request information including a telephone number is transmitted to digital wireless telephone system 101 (A). Based on this call request information digital wireless telephone system determines the type of a subscriber unit and associated telephone system to which the call is directed. If the call is directed to wire based subscriber unit 106 such as wire based subscriber unit 106(A), the call request is forwarded to local PSTN 102(A) and a connection is created between wireless subscriber unit 100(A) and wire based subscriber unit 106(A). Vocoded data is then transmitted from wireless subscriber unit 100(A) over the first RF link to digital wireless telephone system 101(A). Digital wireless telephone system 101(A) responds by devocoding the data and passing pulse code modulated (PCM) data to local PSTN 102(A) which forwards the PCM data to wire based subscriber unit 106(A). On the return path, PCM formatted data from wire based subscriber unit 106(A) passes through local PSTN 102(A) to digital wireless telephone system 101(A). Digital wireless telephone system 101(A) converts the PCM formatted data to vocoded data and transmits the vocoded data via the first RF link to wireless subscriber unit 100(A). Wireless subscriber unit 100(A) proceeds to devocode the vocoded data to generate audio information.

If wireless telephone system 101(A) determines that the telephone call from wireless subscriber unit 100(A) is directed to wireless subscriber unit 100(B), the route through which the data associated with the telephone call is different than that of the telephone call between wireless subscriber unit 100(A) and wire based subscriber unit 106 (A). After digital wireless telephone system 101(A) receives the vocoded data from subscriber unit 100(A) via the first RF link, digital wireless telephone system 101(A) proceeds to transmit that vocoded data to wireless subscriber unit 100(B) through the second RF link. Wireless subscriber unit 100(B) then devocodes the data to generate comprehensible audio formation. On the reverse path, vocoded data from wireless subscriber unit 100(B) is received by wireless telephone system 101(A) via the second RF interface, and then passed to wireless subscriber unit 100(A) via the first RF interface. Wireless subscriber unit 100(A) then also devocodes the vocoded data to generate comprehensible audio information. Thus, the call is routed completely within digital wireless telephone system 101(A), and the audio information is only vocoded a single time in either direction.

If wireless telephone system 101(A) determines that the telephone call from wireless subscriber unit 100 is directed to a wireless subscriber unit that is part of, or interfacing with, a different digital wireless telephone system such as wireless subscriber unit 100(C), vocoded data received via the first RF interface is converted into tones by wireless telephone system 101(A). In the preferred embodiment, this is done in a manner similar to that of a conventional computer modem device that allows digital systems such as computers to communicate and transmit digital information over standard analog telephone lines. These tones are further converted by digital wireless system 101(A) into PCM format and the PCM formatted tones are introduced into local PSTN 102(A). The PCM formatted tones pass through long distance telecommunication carrier 108 and local PSTN 102(B) to digital wireless telephone system 101(B). Digital wireless telephone system 101(B) demodulates the tones to generate an exact or near exact binary copy of the original vocoded data transmitted, the process for which is well known in the art. This vocoded data is then transmitted to wireless subscriber unit 100(C) via the third RF interface where the vocoded data is devocoded in order to produce audio information. Vocoded data on the return path is similarly converted to tones for transmission over local PSTN's 102(A) and 102(B) and long distance telecommunications carrier 108.

In two alternative embodiments of the invention, the step of converting the vocoded data into tones for transmission to the receiving wireless telephone system is omitted. In the first alternative embodiment, the conversion step is omitted by establishing a long distance link which ensures an all digital connection between digital wireless telephone system 101(A) and digital wireless telephone system 101(B). In the preferred embodiment, the request for such a link is made during the initial setup of the telephone call, various methods for which are known in the art including out of band and digital message signaling. In the second alternative embodiment, the vocoded data can be exchanged between digital wireless telephone system 101(A) and digital wireless telephone system 101(B) via ATM service 104. ATM service 104 provides a digital packet based link that substantially ensures the integrity of the digital data transmitted and therefore provides an ideal mechanism for exchanging the vocoded data. However, the present availability of such ATM service is limited.

Once a telephone call between two wireless subscriber units is established, digital wireless telephone system 101(A) monitors wireless subscriber unit 100(A) for requests to initiate a conference call. If such a request is received, the processing of the telephone call is altered. If the telephone call is with a wireless subscriber unit 100 that is part of a different digital wireless telephone system 101, the vocoded data from each wireless subscriber unit 100 is converted into analog data format within the two digital wireless telephone systems 101, instead of into PCM formatted tones. The analog data from the two wireless subscriber units 100 is then combined within digital wireless telephone system 101(A). If the call is between two wireless subscriber units 100 that are part of the digital wireless telephone system 101(A), the vocoded data from each wireless subscriber unit 100 is converted into analog format and combined within digital wireless telephone system 101(A). Once the data is combined, the summed data is revocoded and transmitted back to each of the wireless subscriber units. This causes double vocoding, but allows wireless telephone system 101(A) to provide the feature of conference calling to its subscribers.

To provide the call waiting feature during a telephone call between wireless subscriber unit 100(A) and another wireless subscriber unit 100, digital wireless telephone system 101(A) monitors for incoming telephone call requests directed to wireless subscriber unit 100(A). If the call request is from a wire based subscriber unit 106, additional signal processing resources are allocated within digital wireless telephone system 101(A) to convert the data associated with the second telephone call between vocoded and PCM format. If the call request is from a wireless subscriber unit 100, the call is handled in accordance with a call to another wireless subscriber unit 100 as described above. Once the second call has been established, wireless telephone system 101(A) switches between the two calls in accordance with the standard operation of call waiting.

Figure 2:
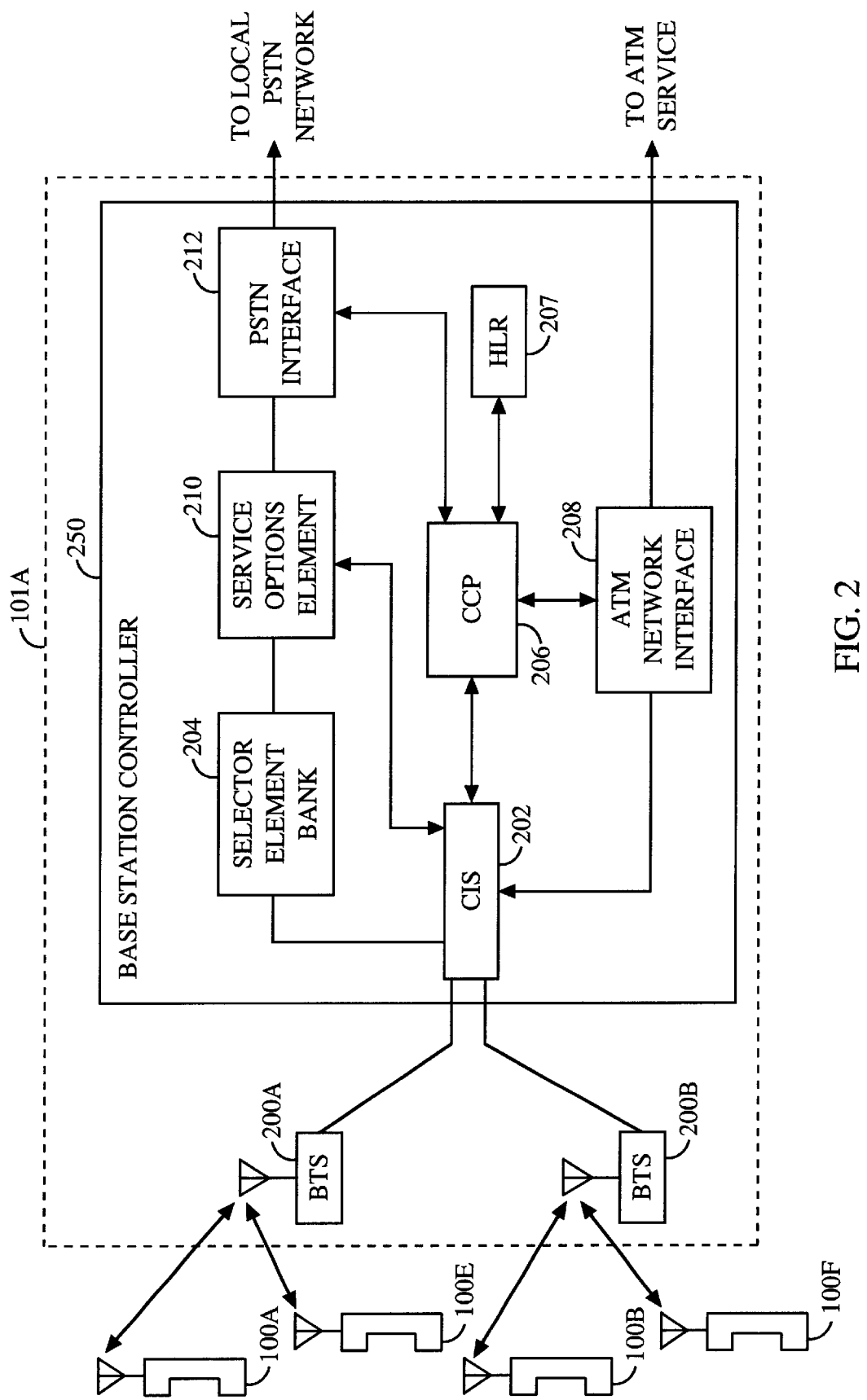
FIG. 2 is a digital wireless telephone system configured in accordance with one embodiment of the invention.

FIG. 2 is a block diagram of a digital wireless telephone system 101(A) configured as a cellular telephone system interfacing with wireless subscriber units 100(A) and 100(B) of FIG. 1 as well as wireless subscriber units 100(E) and 100(F) in accordance with one embodiment of the invention. Base transceiver stations (BTS)200(A) and 200(B) interface with subscriber units 100(A), 200(B), 200(E) and 200(F) via first, second, fifth and sixth RF links respectively, and are coupled to CDMA interconnect subsystem (CIS) 202 located within base station controller 250 via hardwire connection or microwave link. CIS 202 is coupled to selector element bank 204, call control processor (CCP) 206, and ATM network interface 208. CCP 206 is coupled to home location register (HLR) 207 and PSTN interface 212. Service options element 210 is coupled to selector element bank 204 and PSTN interface 212, which is coupled to local PSTN 102(A) of FIG. 1. ATM network interface 208 is coupled to an ATM service 104 of FIG. 1. During operation the various systems communicate using control packets exchanged via the connections shown, and which are routed by CIS 202 via the use of an address contained in each packet. The connections shown also carry traffic data via packets with the type of data contained in a packet being indicated by header bits also contained in each packet.

In an exemplary telephone call, a request to initiate the telephone call including a telephone number from wireless subscriber unit 100(A) is transmitted through the first RF link to BTS 200(A) and CIS 202 to call control processor (CCP) 206. (CCP) 206 determines based on the telephone number whether the telephone call is directed to another wireless subscriber unit 100 and whether that wireless subscriber unit 100 is part of the same wireless telephone system as the originating wireless subscriber unit 100. In the preferred embodiment, these determinations are made using HLR 207 which is a data base stored within a memory system. The HLR stores and tracks the telephone numbers and other associated information of subscribers to the wireless telephone service, and may be located within base station controller 250 as shown, or at a remote location coupled to CCP 206 via high speed network connection. CCP 206 may also make this determination by generating an information request message, preferably during the call set up, directed to the receiving telephone system to indicate what type of system it is, and the telephone system's signal processing capabilities. This second method of determining is preferred where the receiving telephone system is not part of the same wireless telephone service provider.

If CCP 206 determines that the receiving subscriber unit is also part of digital wireless telephone system 101(A) it configures selector element bank 204 to route any information received associated with the call back to CIS 202. Selector element bank 204 performs the function of selecting between two or more instances of data generated when a wireless subscriber unit 100 is in soft handoff, the preferred operation for which is described in U.S. Pat. No. 5,101,501 entitled "METHOD AND SYSTEM FOR PROVIDING SOFT HANDOFF IN COMMUNICATIONS IN A CDMA CELLULAR COMMUNICATION SYSTEM" and U.S. Pat. No. 5,267,261 entitled "MOBILE ASSISTED SOFT HANDOFF IN A CDMA CELLULAR COMMUNICATIONS SYSTEM," both assigned to the assignee of the present invention. Also, CCP 206 configures the selector resource to direct any information received to wireless subscriber unit 100(A) via CIS 202. If the wireless subscriber unit 100(A) is in soft handoff, the selector element resource generates multiple copies of the data being transmitted and directs one copy to each BTS 200 that has established a RF link with wireless subscriber unit 100(A). The data is directed by placing the appropriate address with packets in which the data is transmitted, with the appropriate address being supplied to the selector resource by CCP 206. In the preferred embodiments of the invention, a selector resource is comprised of a microprocessor configured via the use of a set of software instructions stored in a hard-disk or integrated circuit memory or both. Similarly, a second selector resource is allocated for the receiving subscriber unit and vocoded data from the second selector resource is direct back to CIS 202 which passes the vocoded data to wireless subscriber unit 100(A). The number of selector resources that can be provided by a particular microprocessor is determined by the processing power of that microprocessor. In the preferred embodiment of the invention, CCP 206 is comprised of a hard-disk or integrated circuit based memory containing instructions and a microprocessor to for receiving those instructions and generating commands and in response.

If CCP 206 determines that the call from wireless subscriber unit 100(A) is not directed to another wireless subscriber unit, but is directed to a wire based subscriber unit 106, such as wire based subscriber unit 106(A) of FIG. 1, it allocates and configures a selector resource within selector element bank 204 to forward vocoded data from wireless subscriber unit 100(A) to service options element 210. Service options element 210 is configured by CCP 206 to devocode the vocoded data and to place the devocoded data into PCM format. The PCM formatted data is passed into PSTN interface 212 which introduces the PCM formatted data into local PSTN 102(A) (FIG. 1). PSTN 102(A) routes the data to wire based subscriber unit 106(A). On the reverse path, PCM formatted data from the wire based subscribed unit 106 received through PSTN interface 212 is placed into vocoded format by service options element 210 and then routed to wireless subscriber unit 100(A).

If CCP 206 determines that the call request from wireless subscriber unit 100(A) is directed to a wireless subscriber unit 100 that is part of a different wireless telephone system, such as a digital wireless telephone system 101(B) (FIG. 1), it configures selector element bank 204 to route vocoded data from wireless subscriber unit 100(A) to service options element 210. Additionally, CCP 206 configures service options element 210 to convert that vocoded data into tones that are introduced into PSTN interface 212 which forwards the data to local PSTN 102(A) of FIG. 1. CCP 206 also notifies the receiving wireless telephone system during call setup that the data will be delivered in tone format so that the receiving wireless telephone system may prepare to demodulate the data accordingly.

For calls originating from another wireless subscriber unit directed to one of wireless subscriber unit 100(A), 100(B), 100(E) or 100(F), CCP 206 receives notification of an incoming call via PSTN interface 212. In addition to this notification, CCP 206 receives information indicating that the requesting subscriber unit is a wireless subscriber unit that incorporates vocoding techniques compatible with those wireless subscriber units 100 and that the data will be transmitted in tones. In response, CCP 206 configures service options element 210 to receive the vocoded data bits transmitted in tone format and to demodulate those tones in order to generate a substantially accurate version of the vocoded data. This vocoded data is passed through selector element bank 204, CIS 202 and the appropriate BTS 200 to the receiving wireless subscriber unit 100. The vocoded data is then demodulated by that wireless subscriber unit 100 in order to generate audio information.

In the first alternative embodiment of the invention, upon receiving a call request from wireless subscriber unit 100(A) directed to another wireless subscriber unit 100 located at a remote wireless telephone system, CCP 206 transmits a request for an all digital link via PSTN interface 212. If this request is successful, CCP 206 configures service options element 210 to pass the vocoded data into PSTN interface 212, where it is introduced into a local PSTN 102(a) (FIG. 1). Additionally, CCP 206 signals the receiving digital wireless telephone system 101 during the call setup to receive unmodulated vocoded data. Furthermore, if a message is received by CCP 206 indicating an incoming call is arriving via an all digital network, CCP 206 configures service option element 210 to pass the vocoded data onto selector element bank 204 for routing to the receiving digital wireless subscriber unit 100.

In the second alternative embodiment of the invention, upon determining that a call request from wireless subscriber unit 100(A) is directed to another wireless subscriber unit 100 (not shown) that is part of a different wireless telephone system 101 (also not shown) having compatible vocoding capability, CCP 206 configures a selector resource within selector element bank 204 to route information associated with that call back to ATM network interface 208 via CIS 202. ATM network interface 208 passes the data onto ATM service 104 of (FIG. 1), which in turn routes the information to the other wireless subscriber unit 100 to which the call is directed. Incoming requests to communicate received via ATM network interface 208 cause CCP 206 to allocate a selector resource within selector element bank to process the telephone call, and to configure ATM network interface 208 and CIS 202 to direct the incoming vocoded data directly to the selector element resource. The selector element then makes additional copies of the data as needed and routes each copy of the data to the receiving wireless subscriber unit 100.

Once a telephone call between wireless subscriber unit 100(A) and another wireless subscriber unit 100 has been established, CCP 206 monitors for conference call requests directed to wireless subscriber unit 100(A), and takes various actions in response to such a request depending on whether the second wireless subscriber unit is part of wireless telephone system 101(A), for example wireless subscriber unit 100(B). If so, CCP 206 responds by configuring the selector resources assigned to each of wireless subscriber units 100(A) and 100(B), to direct vocoded data to service options element 210. CCP 206 also configures service options element 210 to devocode the vocoded data from wireless subscriber units 100(A) and 100(B), and to pass the unvocoded data to PSTN interface 212. Additionally, CCP 206 configures PSTN interface 212, which contains the necessary multiplexing circuitry, to combine the unvocoded data from wireless subscriber units 100(A) and 100(B), as well as from the third subscriber unit that is entering into the conference call. This third subscriber unit may either be a wireless or a wirebased subscriber unit. The combined data is then directed back to each subscriber unit engaged in the conference call by PSTN interface 212. For each wireless subscriber unit 100 engaged in the conference call and that is part of the same wireless telephone system, the combined data is transmitted through service options element 210, where it is vocoded, and then routed to the intended wireless subscriber unit 100. For a wireless subscriber unit 100 that is part of different digital wireless telephone systems, and for wire based subscriber units 106, the combined data is introduced into local PSTN 102(A) in unvocoded form.

To provide call waiting during a telephone call between wireless subscriber unit 100(A) and another wireless subscriber unit 100 CCP 206 monitors for incoming calls directed to wireless subscriber system 100(A). When such a call is received, CCP 206 notifies the user of wireless subscriber unit 100(A) by generating a vocoded beep or tone, or other type of digital indication message that is routed to the selector resource associated with wireless subscriber unit 100(A). The selector resource then generates copies of the message depending on whether wireless subscriber unit 100(A) is engaged in soft handoff, and routes each copy via CIS 202 to any BTS 200 engaged in an RF link with wireless subscriber unit 100(A). Each BTS 200 then transmits the message to wireless subscriber unit 100(A). If the incoming call is accepted, CCP 206 configures the interface system receiving the data from the second call, which in the embodiment shown is either PSTN interface 212, or ATM network interface 208, to route the data from the second call to the selector resource processing the call. CCP 206 configures the selector resource to forward the data associated with the second call to wireless subscriber unit 100(A) in normal fashion. Data from the first call is ignored by the selector resource during this time. As wireless subscriber unit 100(A) then switches between the first phone call and the second phone call in accordance with the standard operation of the call waiting feature, CCP 206 configures the selector resource to forward the incoming data as associated with the first or second call accordingly, and to direct the data received from wireless subscriber unit 100(A) to the subscriber unit associated with the call that is currently active via the corresponding interface system. Indicating that the call is accepted and switching between the two telephone calls, may be performed via the use of a "flash" or other feature keys, which may be located on the receiving wireless subscriber unit 100.

To properly process and switch between the first and second calls during call waiting, CCP 206 determines whether the second call is from a wireless subscriber unit 100 that is part of the same wireless telephone system 101, or if the second call is from either a wire based subscriber unit 106 or wireless subscriber unit 100 that is part of a different wireless telephone system. In the preferred embodiment, this determination is done in the same manner as the determinations made during call set up. If the second call is from a wireless subscriber unit 100 that is part of the same system, CCP 206 allocates a selector resource within selector element bank to perform the selection function for that wireless subscriber unit 100 and routes the call back through CIS 202 to the receiving subscriber unit 100 if the call is accepted. If the second call is from a wire based subscriber unit 106, or a wireless subscriber unit 100 that is part of a different wireless telephone system, CCP 206 configures service options element 210 to process the data from the incoming telephone call by converting the incoming tones or PCM formatted data into vocoded data as described above. If the call is accepted the vocoded data is routed to the receiving wireless subscriber unit 100 unit.

Thus, a method and system for processing a telephone call between two wireless subscriber units that prevents double vocoding, and that provides the desirable features of conference calling and call waiting, is described. Additionally, the invention provides such functionality while also allowing soft handoff capability to be maintained within a cellular telephone system, which is also highly desirable. While the invention is set forth in the context of a digital wireless telephone system in general and a cellular telephone system in particular, other uses and embodiments of the invention including satellite based telecommunication systems will be apparent to one skilled in the art. The exemplary embodiment provided is merely for purposes of illustration and should not be construed as limiting the scope of the invention.

What is claimed is:

1. A method for processing a telephone call from a wireless subscriber unit that is part of a wireless telephone system, the method comprising the steps of:

receiving a request to make the telephone call to a receiving subscriber unit;

devocoding vocoded data from the wireless subscriber unit if the receiving subscriber unit is a wire-based subscriber unit; and delivering the vocoded data to the receiving subscriber unit if the receiving subscriber unit is a wireless subscriber unit, wherein said delivering step comprises:

routing the vocoded data to the receiving subscriber unit within the wireless telephone system if the receiving subscriber unit is part of the wireless telephone system; and converting the vocoded data into tones and routing the vocoded data through a long distance telecommunications system if the receiving subscriber unit is part of a second wireless telephone system.

2. The method of claim 1, wherein said converting and routing step further comprises signaling to the second wireless system that the vocoded data will be transmitted in tones.

3. A cellular telephone system for processing a telephone call from a requesting subscriber unit to a receiving subscriber unit, the requesting subscriber unit being part of a wireless telephone system, comprising:

signal routing circuitry;

signal processing circuitry for processing vocoded data; and a call control processor coupled to said signal processing circuitry and said signal routing circuitry, for configuring said signal routing circuitry to bypass said signal processing circuitry if the receiving subscriber unit is part of the wireless telephone system, and for configuring said signal processing circuitry to devocode the vocoded data if the receiving subscriber unit is wire-based, wherein said call control processor configures said signal routing circuitry to route the vocoded data to the receiving subscriber unit within said cellular telephone system if the receiving subscriber unit is part of the wireless telephone system, and wherein said call control processor configures said signal processing circuitry to convert the vocoded data into tones and configures said signal routing circuitry to route the vocoded data through a long distance telecommunications system if the receiving subscriber unit is part of a second wireless telephone system.

4. A cellular telephone system for processing a telephone call from a requesting subscriber unit to a receiving subscriber unit, the requesting subscriber unit being part of a wireless telephone system, comprising:

means for routing digital information;

means for processing vocoded data; and means for configuring said means for routing to bypass said means for processing if the receiving subscriber unit is part of the wireless telephone system, and for configuring said means for processing to devocode said vocoded data if the receiving subscriber unit is wire-based, said means for configuring being coupled to said means for processing and said means for routing, wherein said means for configuring configures said means for routing to route the vocoded data to the receiving subscriber unit within said cellular telephone system if the receiving subscriber unit is part of the wireless telephone system, and wherein said means for configuring configures said means for processing to convert the vocoded data into tones and configures said means for routing to route the vocoded data through a long distance telecommunications system if the receiving subscriber unit is part of a second wireless telephone system.

5. The cellular telephone system of claim 4, further comprising means for signaling the second wireless telephone system that the vocoded data will be transmitted in tones, said means for signaling being coupled to said means for configuring and said means for processing and said means for routing.

\* \* \* \* \*